March 12, 1957 — A. GHIORSO ET AL — 2,784,910
PULSE HEIGHT ANALYZER
Filed Aug. 12, 1953
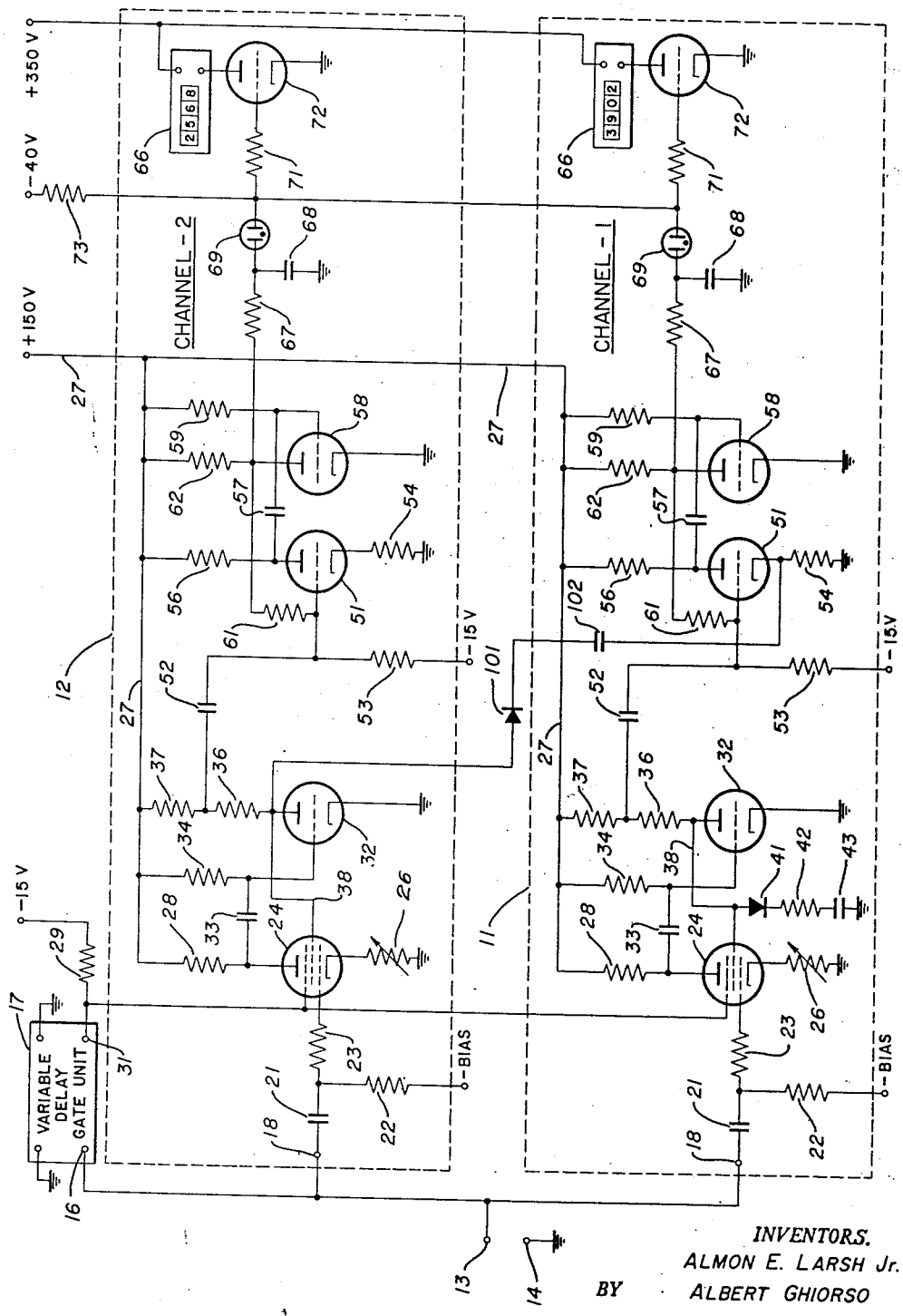
INVENTORS.
ALMON E. LARSH Jr.
ALBERT GHIORSO
BY
Roland A. Anderson
ATTORNEY.

United States Patent Office 2,784,910
Patented Mar. 12, 1957

2,784,910

PULSE HEIGHT ANALYZER

Albert Ghiorso and Almon E. Larsh, Jr., Berkeley, Calif., assignors to the United States of America as represented by the United States Atomic Energy Commission Application August 12, 1953, Serial No. 387,555

4 Claims. (Cl. 235—92)

The present invention relates to an analyzer, and, more particularly, to a multi-channel differential pulse height analyzer.

In many applications of radiation detectors it is desirable to sort the pulses from such detectors according to the magnitudes thereof in order to obtain an energy spectrum of the radiation being detected. Many types of pulse height analyzers have been built, but such known analyzers are complex, costly, or require special types of equipment as component parts. As an illustration of the above-stated complexity, reference is made to Figs. 4.18 and 4.19 on pages 244 and 245, respectively, of "Electronics" by Elmore and Sands, Nuclear Energy Series, V-1, 1949, McGraw-Hill Book Company, Inc. As to special equipment reference is made to U. S. Patent No. 2,560,166 issued to William E. Glenn, Jr., July 10, 1951, wherein a special type of cathode ray tube is set forth as a part of a differential pulse analyzer.

The foregoing disadvantages are overcome in the present invention by the use of a plurality of similar pulse channels characterized by circuits which are simple and non-critical, use few components, and draw low power. Such pulse channels are interconnected so that only that channel operates which corresponds to the maximum value of the input pulse. In the foregoing manner, a differential pulse height analyzer is achieved which lacks the principal disadvantages of known analyzers as outlined above.

It is therefore an object of the present invention to provide a new and improved pulse height analyzer.

Another object of the invention is to provide a simple and less costly differential pulse height analyzer.

Still another object of the invention is to provide a pulse height analyzer having a plurality of similar and interconnected pulse channels for determining the energy spectrum of a source of non-uniform pulses.

A further object of the invention is to provide a pulse height analyzer having a plurality of similar interconnected pulse channels adapted separately to operate only at selected input levels.

A still further object of the invention is to provide a gated one-shot multivibrator circuit having an extremely fast response time.

Another important object of the invention is to provide a multi-element tube and means for increasing the potential applied to the second grid of the tube during the application of a signal to the first grid.

Other objects and advantages of the invention will be apparent in the following description and claims considered together with the accompanying drawing which is a schematic wiring diagram.

Referring to the drawing in detail, there are provided a first pulse channel 11 and a second similar pulse channel 12. Since both of such pulse channels 11 and 12 are the same, similar numbers will be utilized to indicate like elements. While two channels are illustrated in the drawing and will be described in detail hereinafter, the invention is not limited to two channels and as many as desired may be utilized.

A pair of input terminals 13 and 14, one of which is grounded, is provided for connection to a source of pulses (not shown) to be analyzed, such as a radiation detector or similar device. The ungrounded terminal 13 is connected to the input terminal 16 of a conventional variable delay gate unit 17 and a terminal 18 of each pulse channel 11 and 12. One side of a coupling capacitor 21 is connected to the terminal 18 and the other side thereof is connected to the junction between two series-connected resistors 22 and 23 which, in turn, are connected between a source of bias (not shown) and the control grid of a multi-element vacuum tube 24.

The cathode of such tube 24 is connected through a variable resistor 26 to ground and the anode is connected to a lead 27 carrying a voltage of +150 volts through a dropping resistor 28. The third grid of the tube 24 is connected through a resistor 29 to a source of bias (not shown), which maintains the tube in a normally nonconducting state, and is further connected directly to the output terminal 31 of the variable delay gate unit 17 so that the tube may be selectively rendered conductive in response to control grid signal voltages. To transfer voltage changes at the anode of the tube 24 to the control grid of a triode tube 32 a coupling capacitor 33 is connected therebetween. The control grid of such tube 32 is connected to the positive voltage lead 27 through a resistor 34 so that the tube is normally conductive. A connection is made directly from the cathode of the tube 32 to ground and two series-connected resistors 36 and 37 are connected between the positive voltage lead 27 and the anode of the tube to supply suitable operating potentials. The potential at the anode of the tube 32 is impressed upon the second grid of the multi-element tube 24 by a direct connection 38 therebetween and, in the first channel 11, a series circuit comprising a crystal diode 41, a resistor 42, and a capacitor 43 is connected in such order between the anode of the triode tube 32 and ground.

Potential changes at the junction between the two resistors 36 and 37 in the anode circuit of the triode tube 32 are coupled to the control grid of a second triode tube 51 by a coupling capacitor 52. To maintain such second triode tube 51 in a normally non-conducting state a resistor 53 is connected from the control grid of the tube to a source of bias (not shown). The cathode of such second triode tube 51 is connected through a resistor 54 to ground and the anode is connected through a dropping resistor 56 to the positive voltage lead 27 to supply suitable operating potentials to the tube. A coupling capacitor 57 is connected between the anode of the second triode tube 51 and the control grid of a third triode tube 58 and a resistor 59 is connected from such control grid to the positive voltage lead 27 to render the tube normally conductive. A feedback connection is made from the anode of the third triode tube 58 to the control grid of the second triode tube 51 by connecting a resistor 61 therebetween and operating potentials are supplied to the former tube 58 by a direct connection from the cathode to ground and by a connection from the anode to the positive voltage lead 27 through a dropping resistor 62.

A suitable electromechanical register 66 is coupled in a conventional manner to the output of the one-shot multivibrator circuit comprising the second and third triode tubes 51 and 58 to record the number of times such circuit is energized. The coupling is accomplished by connecting a resistor 67 and capacitor 68 in series between the anode of the third triode tube 58 and ground with one side of a neon glow tube 69 connected to the junction between the resistor and capacitor. The other side of the neon glow tube 69 is connected through a current limiting resistor 71 to the control grid of a triode type driver tube 72 and through a resistor 73 to a source of bias (not shown). A connection is made directly from the cathode of the driver tube 72 to ground and from the anode through the actuating coil (not shown) of the register 66 to a source of positive voltage (not shown).

The foregoing describes the manner in which the elements of one channel are interconnected and it will be readily apparent that a plurality of such channels may be used in parallel to count pulses of different heights or magnitudes where the multi-element tubes 24 are successively biased by different values. In such instance the channel having the least amount of bias will record all pulses and it will be necessary to subtract the recorded pulses of the other channels to obtain a proper energy spectrum.

To convert a plurality of such parallel-connected channels into a differential pulse height analyzer, it is necessary to disable all channels except the one which corresponds to the maximum value of the incoming pulse so that the pulse is recorded by only the particular channel. In order to accomplish the foregoing, a series-connected crystal diode 101 and capacitor 102 is connected between the anode of the first triode tube 32 in the second channel 12 and the cathode of the second triode tube 51 in the first channel 11. Such series-connected circuit is required in the same manner between additional channels where more than two are utilized; that is, if three channels are used the series-connected circuit is connected from the anode of the first triode tube 32 of the third channel (not shown) to the cathode of the second triode tube 51 of the second channel 12 as well as the connection between the second and first channels 12 and 11, described above. It is to be noted that the crystal diode 41, resistor 42, and capacitor 43 described as being included in the first channel 11 corresponds to the crystal diode 101, capacitor 102, and cathode resistor 54, and that the former circuit combination is included in the first channel for balance purposes so that the characteristics of each channel are the same.

Consider now the operation of a single channel 11 with suitable operating potentials applied. A positive pulse occurring at the input terminals 13 and 14 is impressed upon the input of the variable delay gate unit 17 and upon the control grid of the multi-element tube 24. If the value of the input pulse is sufficient to overcome the bias of the control grid of such multi-element tube 24, the tube is placed in a conductive state. The bias upon the third grid of the tube 24 is sufficient to prevent conduction of the tube even when the voltage of the control grid is above the cut off value. The variable delay gate unit 17 is set to develop a narrow delayed output pulse in response to an input pulse. The amount of delay incorporated in the unit 17 is such that the input pulse is at maximum value when the delayed pulse reaches the third grid of the multi-element tube 24. Thus, when the first and third grids of the tube 24 are impressed with voltages above the cut off value of the tube 24, conduction results and the anode voltage decreases. Since the control grid of the first triode tube 32 is coupled to the anode of the tube 24, conduction in the first triode tube decreases and the anode voltage increases. The increase in anode voltage of the first triode tube 32 is impressed upon the second grid of the multi-element tube 24 to increase the voltage thereof. Such increase in second grid voltage of the multi-element tube 24 accelerates electrons flowing from cathode to anode and thereby speeds up the action of the tube to cut off the conduction of the first triode tube 32. The action of the two tubes 24 and 32 is faster than conventional one-shot multivibrator circuits and has been termed a "snapper" circuit for such reason. At the termination of the pulse from the gate unit 17 the circuit comprising the multi-element and first triode tubes returns to its original state with the former non-conductive and the latter conductive.

The increase in anode voltage of the first triode tube 32, in response to an input pulse, is coupled to the control grid of the normally non-conductive second triode tube 51 which is the input tube of a conventional one-shot multivibrator. Such one-shot multivibrator comprises the second and third triode tubes 51 and 58, and develops a positive square wave output voltage in response to each positive input pulse. The output voltage of the multivibrator is coupled to the driver tube 72 by a neon glow tube 69 which gives a visual indication of each pulse and also serves as a regulator in the circuit. Each time the control grid of the driver tube 72 is pulsed positively the tube conducts and draws current through the actuating coil of the register 66. Thus there has been described the operation of each channel.

Now with a plurality of such channels connected as a differential pulse height analyzer as illustrated in the drawing, successive channels are biased with increasing values at the first grid of the multi-element tube 24. As an example of the foregoing, a source of voltage having a value of —5 volts is connected to the resistor 22 in the first channel 11, a source of —10 volts is similarly connected in the second channel 12, and successive channels are biased with successively increasing incremental voltages. With the bias voltages set, as for the example stated, an input pulse having a maximum value greater than 10 volts will result in operation of the "snapper" circuit (tubes 24 and 32) in each channel. Before the multivibrator circuit (tubes 51 and 58) of the first channel 11 is actuated the positive pulse which occurs at the anode of the first triode tube 32 in the second channel 12 is impressed at the cathode of the second triode tube 51 in the first channel to render the tube insensitive to the positive pulse from the anode of the first triode tube 32 of the first channel. In such manner only the channel corresponding to the maximum value of the input pulse records a count on the register 66 associated therewith and a differential analyzer has been provided.

A list of the principal elements of the invention follows, but is not to be considered as a limitation as to such elements.

21, capacitor .01 microfarads, 500 v.
22, resistor 200K ohms
23, resistor 51K ohms
24, tube, type 6BN6
26, resistor, variable, 0–50 ohms
28, resistor 10K ohms
29, resistor 10K ohms
32, tube, ½ type 12AU7
33, capacitor .01 microfarads, 500 v.
34, resistor 1M ohms
36, resistor 10K ohms
37, resistor 15K ohms
41, crystal IN–44
42, resistor 10K ohms
43, capacitor .01 microfarads, 500 v.
51, tube, ½ type 12AU7
52, capacitor 25 micromicrofarads, 500 v.
53, resistor 150K ohms
54, resistor 10K ohms
56, resistor 150K ohms
57, capacitor .05 microfarad, 200 v.
58, tube, ½ type 12AU7
59, resistor 1M ohms
61, resistor 240K ohms
62, resistor 150K ohms
66, electromechanical register
67, resistor 100K ohms
68, capacitor 25 micromicrofarads, 500 v.
69, neon glow lamp
71, resistor 100K ohms
72, tube ½ type 5687
101, crystal IN–44
102, capacitor .01 microfarad, 500 v.

From the foregoing list it is readily apparent that only conventional elements have been utilized well within the ratings thereof, and it has been found that the power drain is only 5 milliamperes per channel at the indicated 150 volt operating potential. The circuit has been found to retain good stability and may be easily adjusted to operate with as low a channel width as 10 millivolts.

The circuit has been described as a pulse height analyzer; however, it is readily adapted to many types of coincidence and anti-coincidence applications by suitable connections to the first and third grids of the multi-element tube 24. While the salient features of the present invention have been described with respect to one embodiment it will, of course, be apparent that numerous modifications may be made within the spirit and scope of the invention and it is therefore not desired to limit the invention to the exact details shown except insofar as they may be defined in the following claims.

What is claimed is:

1. In a pulse height analyzer, the combination comprising a plurality of pulse channels, each of said channels comprising an input section connected to a source of input pulses, a pair of triode tubes interconnected as a grid-controlled one-shot multivibrator having the grid of one tube connected to the output of said input section, and a register coupled to the output of said multivibrator; means connected to each of the input sections of said plurality of channels rendering such sections responsive to pulses having values below successively graded values; and means connected between the output of the input section in one channel and the cathode of said one of said tubes in the preceding channel whereby the register of only one channel is actuated for each input pulse.

2. In a pulse height analyzer, the combination comprising a plurality of pulse channels, each of said channels comprising a gated input section connected to a source of input pulses, a pair of triode tubes interconnected as a grid-controlled one-shot multivibrator having the grid of one tube connected to the output of said gated input section, and a register coupled to the output of said multivibrator; delay means connected between said source of input pulses and said gated input section of each channel for rendering such sections operable only at peak values of input pulses; means connected to each of the input sections for rendering such sections responsive to pulses having values below successively graded values; and means connected between the output of the input section of one channel and the cathode of said one of said tubes of the preceding channel whereby the register of only one channel is actuated for each input pulse.

3. In a pulse height analyzer, the combination comprising a plurality of pulse channels, each of said channels having an input section for receiving input pulses from a single source, a multivibrator section connected to said input section responsive to pulses passed thereby, and a register connected to said multivibrator section to record alterations in said multivibrator section; means included in the input section of each of said plurality of channels rendering each responsive to a different amplitude of input pulse; and means connected between the input section of each of said channels and the multivibrator section of the channel having the input section responsive to input pulses of next lesser amplitude to deliver a blocking voltage to the latter channel whereby the register of only one channel is actuated for each input pulse.

4. In a pulse height analyzer, the combination comprising a plurality of pulse channels, each of said channels having a gated input section with two inputs and an output, a multivibrator section connected to the output of said gated input section responsive to pulses passed thereby, and a register connected to said multivibrator section to record alterations in said multivibrator section; one input of the input section of each of said plurality of pulse channels connected together and further connected to a single source of input pulses having nonuniform amplitudes; the other input of the input section of said plurality of pulse channels connected together and further connected to a variable delay gate unit adapted to develop a gate voltage in response to the peak value of said input pulses; means included in the input section of each of said plurality of channels rendering each responsive to different amplitude of input pulses; and means connected between the input section of each of said channels and the multivibrator section of the channel having the input section responsive to input pulses of next lower amplitude to deliver a blocking voltage to the latter channel whereby the register of only one channel is actuated for each input pulse.

References Cited in the file of this patent

UNITED STATES PATENTS

| | | |
|---|---|---|
| 2,529,666 | Sands | Nov. 14, 1950 |
| 2,541,039 | Cole | Feb. 13, 1951 |
| 2,572,038 | Kinne | Oct. 23, 1951 |
| 2,573,446 | Ingalls | Oct. 30, 1951 |
| 2,642,527 | Kelley | June 16, 1953 |

OTHER REFERENCES

"Electronics for the Nuclear Physicist—II," pp. 16–36, Nucleonics, March 1948.